United States Patent
Okada

(10) Patent No.: US 10,830,607 B2
(45) Date of Patent: Nov. 10, 2020

(54) MOVEMENT ANALYZER, MOVEMENT ANALYSIS METHOD, AND PROGRAM STORAGE MEDIUM

(71) Applicant: CASIO COMPUTER CO., LTD., Shibuya-ku, Tokyo (JP)

(72) Inventor: Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 332 days.

(21) Appl. No.: 15/907,760

(22) Filed: Feb. 28, 2018

(65) Prior Publication Data
US 2018/0274938 A1 Sep. 27, 2018

(30) Foreign Application Priority Data

Mar. 23, 2017 (JP) .................. 2017-058212

(51) Int. Cl.
*G01C 23/00* (2006.01)
*G01P 13/00* (2006.01)
*G01C 22/00* (2006.01)
*G01P 13/02* (2006.01)
*A63B 69/18* (2006.01)

(52) U.S. Cl.
CPC .......... *G01C 23/00* (2013.01); *G01C 22/006* (2013.01); *G01P 13/0006* (2013.01); *A63B 69/18* (2013.01); *G01P 13/02* (2013.01)

(58) Field of Classification Search
None
See application file for complete search history.

(56) References Cited

U.S. PATENT DOCUMENTS 9,014,983 B1 * 4/2015 Uy .......................... G01W 1/02
244/30
2015/0335948 A1 * 11/2015 Helm ................. A63B 24/0062
700/91

(Continued)

FOREIGN PATENT DOCUMENTS

EP 3072440 A1 * 9/2016 .......... A61B 5/0015
JP 2003236028 A 8/2003

(Continued)

OTHER PUBLICATIONS

Japanese Office Action dated Oct. 8, 2019 (and English translation thereof) issued in Japanese Patent Application No. 2017-058212.

(Continued)

*Primary Examiner* — Daniel S Larkin
(74) *Attorney, Agent, or Firm* — Holtz, Holtz & Volek PC

(57) ABSTRACT

A movement analyzer includes a position information acquiring device, a memory, and a processor. The processor executes a program to perform operations including acquiring position information of the movement analyzer with the position information acquiring device, determining whether or not a moving state of the movement analyzer is a specific moving state, and recording the position information corresponding to the specific moving state in the memory as a path of the specific moving state when a determination result indicates that the moving state of the movement analyzer is the specific moving state.

18 Claims, 7 Drawing Sheets

(56) References Cited

U.S. PATENT DOCUMENTS

2016/0202057 A1* 7/2016 White .................. H04W 4/029
　　　　　　　　　　　　　　　　　　　　73/170.31
2016/0361598 A1　12/2016 Nagahara
2017/0266492 A1　9/2017 Koshida et al.

FOREIGN PATENT DOCUMENTS

JP　　2015008440 A　1/2015
JP　　2017000353 A　1/2017
WO　　2016092912 A1　6/2016

OTHER PUBLICATIONS

Japanese Office Action dated Jan. 21, 2020 (and English translation thereof) issued in Japanese Application No. 2017-058212.

* cited by examiner

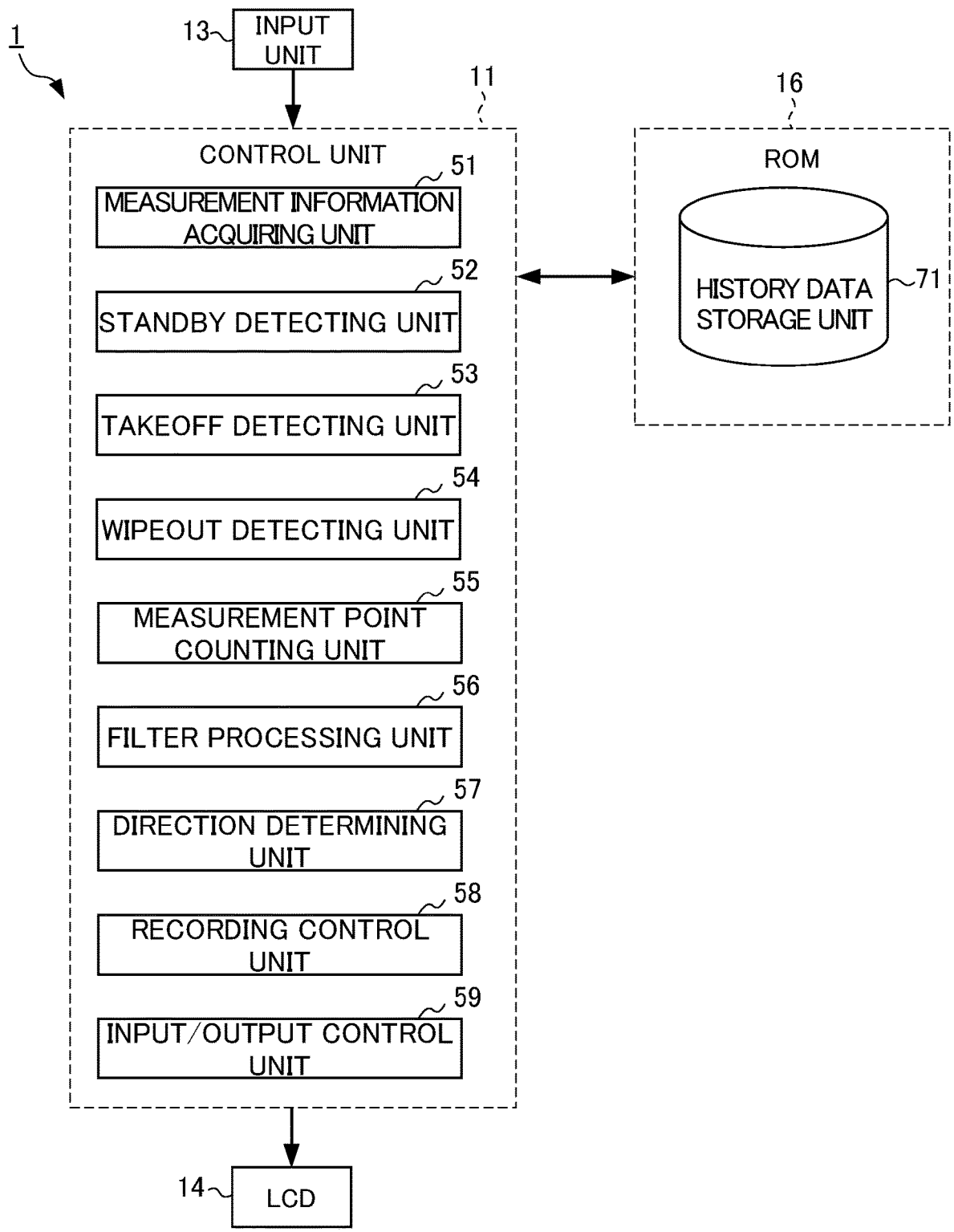

MOVEMENT ANALYZER, MOVEMENT ANALYSIS METHOD, AND PROGRAM STORAGE MEDIUM

This application is based on and claims the benefit of priority from Japanese Patent Application No. 2017-058212, filed on Mar. 23, 2017, the content of which is incorporated herein by reference.

BACKGROUND OF THE INVENTION

Field of the Invention

The present invention relates to a technique of measuring various kinds of data through a device including a sensor therein worn on a body in sports such as surfing, snowboarding, or cycling.

Related Art

According to a conventionally-known technique employed for a sport such as surfing, snowboarding, or cycling, for example, a device with a built-in sensor is attached to a body to measure various types of data about, the sport. For example, a sport assistance portable device including a global positioning system (GPS) is disclosed in Patent Document 1. According to the technique disclosed in Patent Document 1, for doing a sport such as skiing, snowboarding, or mountain biking, for example, every recording data such as a transition of altitude change, an average slope, a maximum slope, etc., is acquired based on data obtained by a GPS circuit unit. The acquired recording data is displayed on a display unit or stored into a memory.

Patent Document 1: Japanese Unexamined Patent Application, Publication No. 2003-236028

SUMMARY OF THE INVENTION

A movement analyzer according to one aspect of the present invention, includes a position information acquiring device, a memory, and a processor, wherein the processor executes a program to perform operations comprising: acquiring position information of the movement analyzer with the position information acquiring device; determining whether or not a moving state of the movement analyzer is a specific moving state in the sport; and recording the position information corresponding to the specific moving state in the memory as a path of the specific moving state when the moving state of the movement analyzer is determined to be the specific moving state. A movement analysis method of recording position information executed by a movement analyzer according to one aspect of the present invention comprises: acquiring the position information of the movement analyzer; determining whether or not a user holding the movement analyzer is in a specific moving state in the sport; and recording position information corresponding to the specific moving state in a predetermined recording means as a path of the specific moving state when the user holding the movement analyzer is determined to be in the specific moving state. A non-transitory computer-readable storage medium storing a program according to one aspect of the present invention executable by a computer of a movement analyzer that includes a processor, and the program is executable to cause the computer to perform operations comprising: acquiring position information of a movement analyzer; determining whether or not a moving state is a specific moving state; and recording the position information corresponding to the specific moving state in a predetermined storage unit as a path of the specific moving state when the user holding the movement analyzer is determined to be in the specific moving state.

BRIEF DESCRIPTION OF THE DRAWINGS

FIG. 2 is a functional block diagram showing a functional configuration for executing moving path recording processing (movement analysis processing) in the functional configuration of the wrist terminal of the embodiment.

DETAILED DESCRIPTION OF THE INVENTION

Figure 1A:
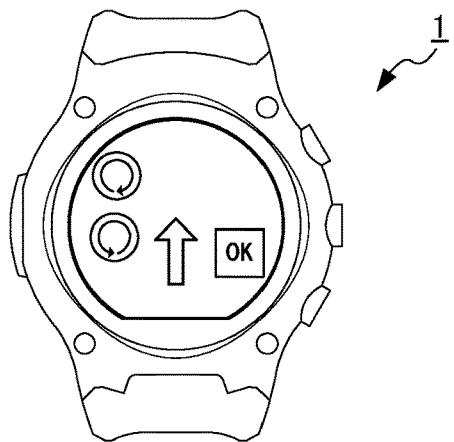
FIG. 1A is an external configuration view of a configuration of a wrist terminal serving as an embodiment of a movement analyzer according to the present invention.

An embodiment of the present invention will be described below by referring to the drawings.

Hardware Configuration

Figure 1B:
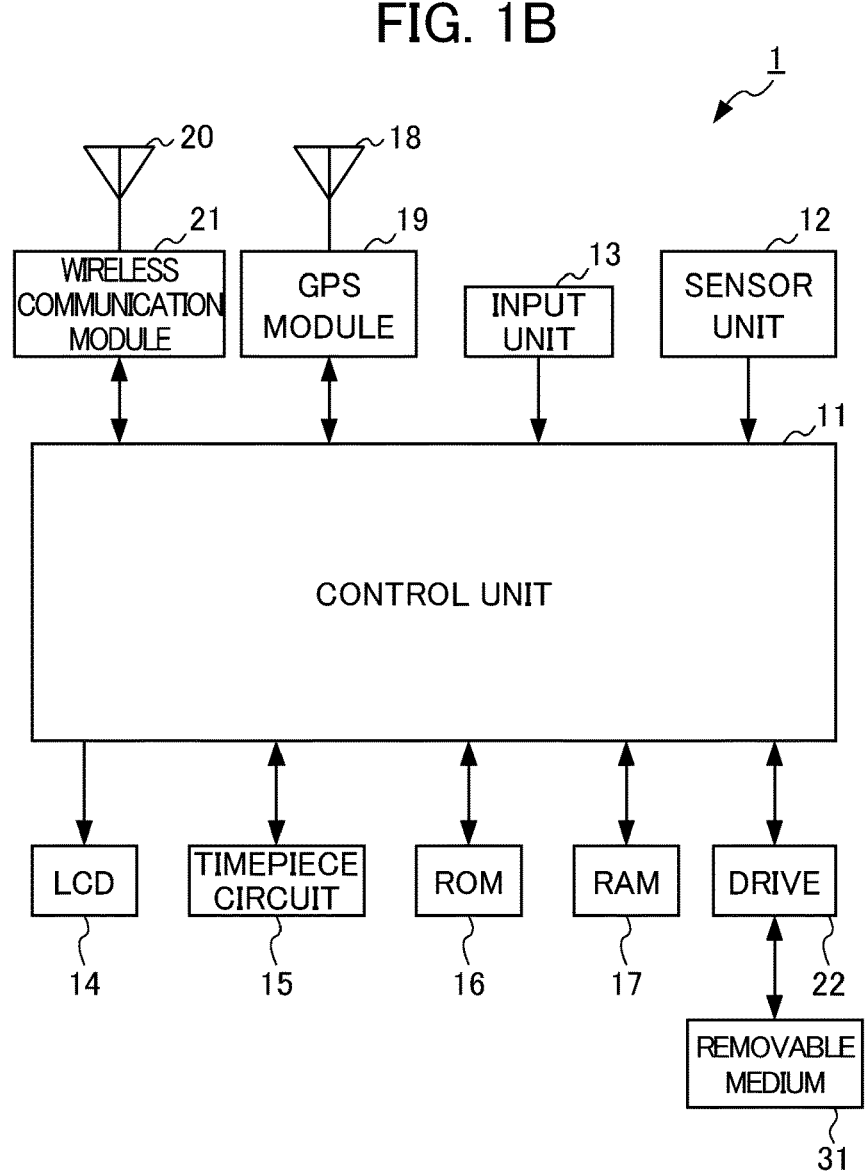
FIG. 1B is a block diagram showing a hardware configuration of a wrist terminal as an embodiment of a movement analyzer according to the present invention.

FIGS. 1A and 1B are diagrams illustrating the configuration of the wrist terminal 1 serving as an embodiment of a movement analyzer according to the present invention. More specifically, FIG. 1A is a view illustrating an outer appearance of the wrist terminal 1. FIG. 1B is a block diagram illustrating a hardware configuration of the wrist terminal 1. The wrist terminal 1 is an electronic apparatus that is configured to be of wristwatch type and has functions similar to a smart phone. As illustrated in FIGS. 1A and 1B, the wrist terminal 1 includes a control unit 11, a sensor unit 12, an input unit 13, an LCD (Liquid Crystal Display) 14, a timepiece circuit 15, ROM (Read Only Memory) 16, RAM (Read Access Memory) 17, a GPS antenna 18, a GPS module 19, a wireless communication antenna 20, a wireless communication module 21, and a drive 22. Where appropriate, the wrist terminal 1 can include different hardware such as an imaging unit.

The control unit 11 is configured with an arithmetic processing unit such as a CPU (Central Processing Unit) and controls the overall operation of the wrist terminal 1. For example, the control unit 11 executes various types of processing according to a program such as a program for moving path recording processing (described later) stored in the ROM 16. The sensor unit 12 includes various types of sensors such as a magnetic field sensor, a three-axis acceleration sensor, a pressure sensor, and altitude sensor. The acceleration sensor detects an acceleration in three axis directions of the wrist terminal 1, and outputs information indicating the detected acceleration to the control unit 11. The gyroscope sensor detects an angular velocity in three axis directions of the wrist terminal 1, and outputs information indicating the detected angular velocity to the control unit 11. The pressure sensor detects the atmospheric pressure of environment where the wrist terminal 1 belongs, and outputs information indicating the detected atmospheric pressure to the control unit 11. Based on the information output from the pressure sensor, the wrist terminal 1 detects the altitude of the wrist terminal 1.

The input unit 13 is configured with various buttons or capacitive-type or resistance-film-type position input sensors laminated on a display area of the LCD 14, and inputs various types of information according to a user's operation for instruction. The LCD 14 outputs an image according to an instruction of the control unit 11. For example, the LCD 14 displays various images and screens of a user interface. In the present embodiment, a position input sensor of the input unit 13 is arranged so as to be superimposed on the LCD 14 to constitute a touch screen. The timepiece circuit 15 generates a time signal from signals generated by a system clock or oscillator to output the current time.

The ROM 16 stores information such as control programs executed by the control unit 11. The RAM 17 provides a work area upon the control unit 11 executing various types of processing. The GPS antenna 18 receives radio waves sent from satellites for GPS, converts them into electrical signals, and outputs the electrical signals thus converted (hereinafter, referred to as "GPS signal") to the GPS module 19. The GPS module 19 detects the location (latitude, longitude, and altitude) of the wrist terminal 1 and the current time shown by the GPS based on the GPS signals inputted from the GPS antenna 18. Furthermore, the GPS module 19 outputs information showing the location thus detected and the current time to the control unit 11.

The wireless communication antenna 20 is an antenna that can receive radio waves of frequencies corresponding to wireless communication used by the wireless communication module 21 and is configured with a loop antenna and a rod antenna, for example. The wireless communication antenna 20 sends electrical signals of wireless communication inputted from the wireless communication module 21 as electromagnetic waves, converts the electromagnetic waves thus received into electrical signals, and outputs them to the wireless communication module 21. The wireless communication module 21 sends signals to another apparatus via the wireless communication antenna 20 in accordance with an instruction from the control unit 11. Furthermore, the wireless communication module 21 receives signals sent from another apparatus and outputs information indicated by the signals thus received to the control unit 11. A removable medium 31 composed of a magnetic disk, an optical disk, a magneto-optical disk, semiconductor memory or the like is installed in the drive 22, as appropriate. The removable medium 31 can store a variety of data such as the image data.

FIG. 2 is a functional block diagram showing a functional configuration for executing moving path recording processing (movement analysis processing) in the functional configuration of the wrist terminal 1 in FIGS. 1A and 1B. The moving path recording processing indicates a series of processes of recording a path satisfying a preset condition among movement paths of a user as a riding path on the basis of various kinds of measurement information acquired about movement of the user wearing the wrist terminal 1 when an automatic measurement mode of automatically performing measurement of a moving situation is set. The present embodiment, will be described with an example in which various kinds of measurement information when the user wearing the wrist terminal 1 performs surfing is acquired, and exercise of the user is analyzed. In the following description, an action of a surfer of riding a wave and standing up on a surfboard is referred to as "takeoff," a subsequent action of falling off the surfboard resulting, for example, from a wave break is referred to as "wipeout," and a state in which the surfer is on a wave from the takeoff to the wipeout is referred to as "riding."

In a case in which moving path recording processing is performed, a measurement information acquiring unit 51, a standby detecting unit 52, a takeoff detecting unit 53, a wipeout detecting unit 54, a measurement point counting unit 55, a filter processing unit 56, a direction determining unit 57, a recording control unit 58, and an input/output control unit 59 come into operation in the control unit 11 as shown in FIG. 2. A history data storage unit 71 is set in one region of the ROM 16. The history data storage unit 71 stores data about a riding history for each ride of surfing. In this embodiment, data about a riding history to be stored includes a path of riding (position and height), a highest speed, a distance of one riding, a duration of one riding, a time of takeoff, and the like. One riding is assumed to be counted as "one motion."

The measurement information acquiring unit 51 acquires a result of positioning by the GPS module 19 and results of detections by the various sensors provided in the sensor unit 12 (where appropriate, these results will collectively be called "measurement information") at predetermined intervals (at intervals of 0.1 seconds, for example). In this embodiment, the measurement information also includes data obtained by making appropriate calculation (differentiation, for example) on the output data from the sensor.

The standby detecting unit 52 determines whether or not a user wearing the wrist terminal 1 is in a standby state for surfing based on the measurement information acquired by the measurement information acquiring unit 51. A determination as to whether or not the user is in the standby state for surfing can be made by determining whether or not the position of the user is closer to the sea than a shoreline, for example. After the standby detecting unit 52 detects the standby state for surfing, the standby detecting unit 52 determines whether or not the user has finished surfing. A determination as to whether or not the user has finished surfing can be made by determining whether or not the position of the user is closer to land than the shoreline. In this description, the standby state is to be detected automatically. Alternatively, in response to user's operation on a button, the standby detecting unit 52 may accept the manual setting of the standby state.

The takeoff detecting unit 53 determines whether or not the user wearing the wrist terminal 1 has taken off based on the measurement information acquired by the measurement information acquiring unit 51. In this embodiment, a determination as to whether or not the user wearing the wrist terminal 1 has taken off can be made by determining whether or not a moving speed has reached a speed threshold (here, 15 [km/h]) or more.

The wipeout detecting unit 54 determines whether or not the user wearing the wrist terminal 1 has wiped out on the basis of the measurement information acquired by the measurement information acquiring unit 51. In this embodiment, the determination of whether or not the user wearing the wrist terminal 1 has wiped out is assumed to be performed by determining whether or not a moving speed is less than a second threshold value Th2 (for example, 2 [km/h]) lower than a first threshold value Th1. In this embodiment, the user is determined to wipe out when three consecutive measurement points at which the moving speed is less than the second threshold value Th2 appear. Even when a positioning result of the GPS module 19 is not obtained for a certain period (for example, 10 [sec]) or more after the takeoff detecting unit 53 detects the takeoff of the user, the wipeout detecting unit 54 determines that the user has wiped out. The first threshold value Th1 and the second threshold value Th2 can be arbitrarily set by the user performing an operation on the wrist terminal 1.

The measurement point counting unit 55 counts the number of measurement points at which the user is determined to have taken off on the basis of the measurement information acquired by the measurement information acquiring unit 51. In other words, the measurement point counting unit 55 counts the number of measurement points at which the moving speed is the first threshold value Th1 or more among the measurement points of a predetermined time interval during a period until the user is detected to have wiped out after the user is detected to have taken off. Then, when a counted value is a predetermined threshold value or more (for example, 5 points), the measurement point counting unit 55 sets data of the measurement points from the takeoff to the wipeout of the user to processing target data.

The filter processing unit 56 applies filter processing for excluding data estimated to be an inappropriate measurement point to the data of the measurement points set as the processing target data in the measurement point counting unit 55. In this embodiment, when the positions of the measurement points which are chronologically adjacent are sequentially compared, the filter processing unit 56 performs processing of thinning out the measurement points having a position change from a coast to a sea, for example, because the data of the measurement point includes a positioning error of the GPS.

The direction determining unit 57 determines whether or not a direction of the movement path of the measurement point is within a predetermined angle range with respect to a traveling direction of an input wave (to be described later). The direction determining unit 57 sets the direction of the movement path of the measurement point as a riding path of a recording target when the direction of the movement path of the measurement point is within a predetermined angle range with respect to the traveling direction of the input wave. On the other hand, when the direction of the movement path of the measurement point is not within a predetermined angle range with respect to the traveling direction of the input wave, the direction determining unit 57 does not set it as the riding path of the recording target. For example, when the direction of the movement path of the measurement point is within 20° from the right angle to the traveling direction of the wave (70° or more deviates from the traveling direction of the wave), it is unlikely to be movement of riding the wave (there is a high possibility of a positioning error, wave waiting, paddling, or the like), it is not set as the riding path of the recording target.

If the standby detecting unit 52 detects the standby state for surfing, the recording control unit 58 starts temporarily storing the measurement information acquired by the measurement information acquiring unit 51 into the RAM 17. For example, if the standby state for surfing is detected, the recording control unit 58 stores measurement information corresponding to a predetermined period of time (60 seconds, for example) sequentially into a storage region such as a first-in first-out (FIFO) storage region formed in the RAM 17. Further, when the wipeout is detected after the takeoff is detected, the recording control unit 58 records (stores) measurement information set as the recording target by the direction determining unit 57 among the measurement information from the takeoff to the wipeout which is temporarily stored in the RAM 17 in the ROM 16 or the removable medium 31 loaded into the drive 22. The measurement information set as the recording target by the direction determining unit 57 is measurement information determined to satisfy a condition for the riding history in the measurement point counting unit 55, the filter processing unit 56, and the direction determining unit 57. At this time, the recording control unit 58 may record the measurement information from a predetermined time (for example, 3 seconds) before the takeoff to a predetermined time (for example, 3 seconds) after the wipeout.

When the measurement information starts to be temporarily stored in response to the detection of the standby state by the standby detecting unit 52, the input/output control unit 59 causes predetermined measurement information to be displayed on the LCD 14 as data being measured. Further, when an instruction to display a map screen for the movement path is given by the user, the input/output control unit 59 causes a map screen in which the movement path of each riding is indicated on a map to be displayed on the LCD 14 on the basis of the measurement information recorded in the ROM 16 or the removable medium 31 by the recording control unit 58. At this time, the input/output control unit 59 acquires map information around a current position and causes the acquired map information to be displayed on the LCD 14 as a background. Further, the input/output control unit 59 performs various kinds of displays related to a surfing mode which is an operation mode in which recording related to surfing is performed in accordance with the operation of the user on the wrist terminal. In other words, the input/output control unit 59 displays information indicating that the surfing mode is set, a message for requesting a direction of the map to be set so that the traveling direction of the wave is upward in the screen, a rotation operation reception button for receiving an operation of rotating the map, information for receiving completion of a map rotation operation, and the like. Further, when a touch operation or the like is performed on content displayed on the LCD 14, the input/output control unit 59 detects the content of the operation and performs various kinds of settings or an input of information, and the like.

Figure 3:
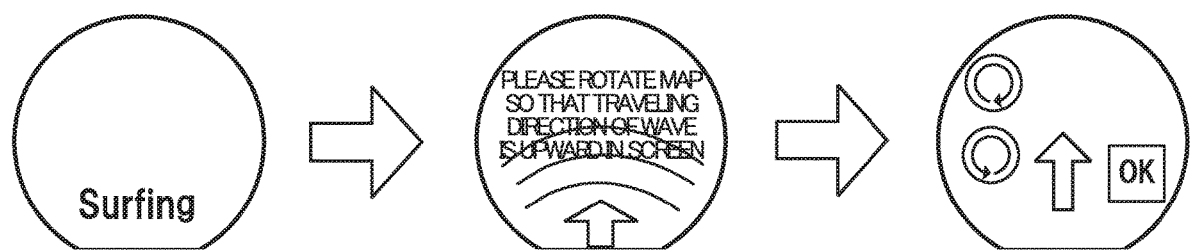
FIG. 3 is a schematic view showing an example of transition of a user interface screen in the wrist terminal of the embodiment.

FIG. 3 is a schematic view showing an example of transition of a user interface screen in the wrist terminal 1 of FIG. 1. If the surfing mode in which the recording related to the surfing is recorded is selected in the automatic measurement mode by the operation of the user on the wrist terminal, information indicating that the surfing mode is set is displayed on the user interface screen. In a display example at the left of FIG. 3, a character display of "Surfing" is performed as the display of the information indicating that the surfing mode is set. If the surfing mode is set, a message for requesting the map to be set so that the traveling direction of the wave is upward in the screen is displayed on the user interface screen. In a display example at the center of FIG. 3, a character display "Please rotate map so that traveling direction of wave is upward in screen" is performed.

After the character display of the above message is performed for a predetermined period of time, the rotation operation reception screen for receiving the operation for rotating the map is displayed. In the display example at the right of FIG. 3, a clockwise arrow button, a counterclockwise arrow button, and an "OK" button for receiving completion of the map rotation operation are displayed. It is possible to rotate the map by a predetermined angle by performing a single tap operation on the clockwise arrow button and the counterclockwise arrow button. The user can rotate the map by a desired angle by repeatedly performing an appropriate number of tap operations. If the "OK" button is operated, the input/output control unit 59 acquires the traveling direction of the wave, and a direction of a coast or sea (that is, the direction of the map) from the display content of the LCD 14. Thereafter, the measurement in the surfing mode starts. Accordingly, the traveling direction of the wave (for example, a direction perpendicular to the coast from the sea) is set in the wrist terminal 1. In other words, the input/output control unit 59 sets the traveling direction of the wave and the direction of the coast or the sea with respect to the direction of the display screen of the LCD 14 in response to the operation of the user.

Figure 4:
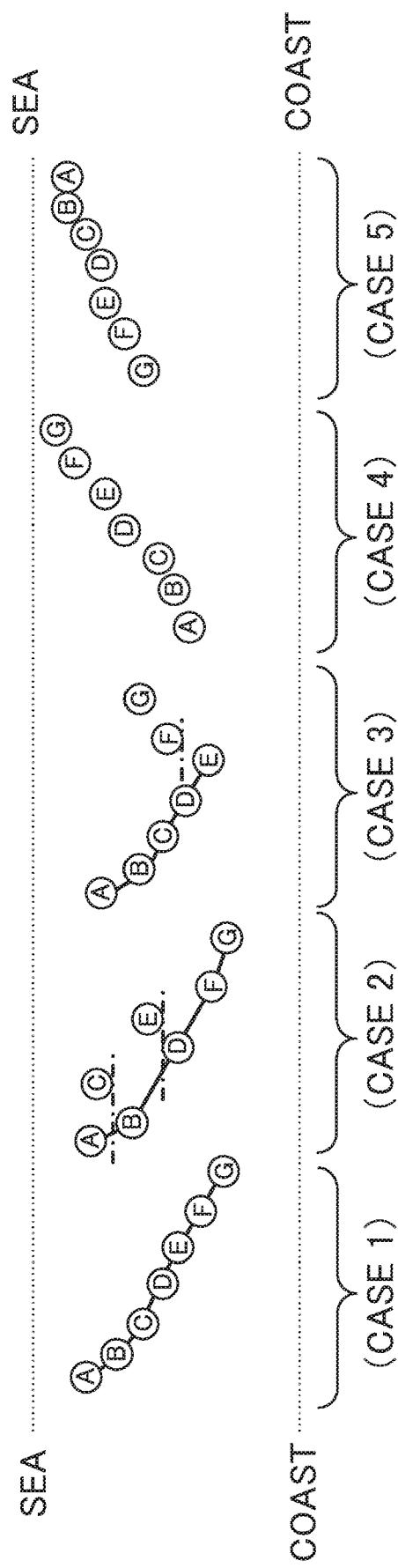
FIG. 4 is a schematic view showing transition of a measurement point at a predetermined time interval during a period until wipeout is detected after takeoff of a user is detected.

FIG. 4 is a schematic view showing the transition of the measurement points at a predetermined time interval during the period until the wipeout is detected after the user is detected to have taken off. Here, the measurement points A, B, C, . . . indicate chronological positions of the wrist terminal 1 worn on the body of the surfer who is the user. As described above, the measurement points A, B, C, . . . are the measurement points of a predetermined time interval during the period until the user is detected to be in the wipeout state by the wipeout detecting unit 54 after the user is detected to be in the takeoff state by the takeoff detecting unit 53. The measuring points at which the moving speed is the first threshold value Th1 or more are indicated as the measurement points A, B, C, . . . . When the number of the measurement points A, B, C, . . . counted by the measurement point counting unit 55 is a predetermined threshold value (for example, five points) or more, data of the measurement points from the takeoff to the wipeout of the user is as the processing target data.

In an example indicated as a "case 1" in FIG. 4, the measurement point gradually moves from the sea toward the coast in the order of A→B→C→D→E→F→G. On the other hand, in an example indicated as a "case 2," after the measurement point moves from the sea toward the coast as in A→B, the measurement point moves from the coast toward the sea as in B→C. Since such a motion is considered to be caused by the positioning error of the GPS or the like, the measurement point is regarded as being inappropriate, and the filter processing unit 56 thins out the measurement point C and estimates the measurement points A→B→D as an actual movement path. Since the measurement points D→E also move from the coast to the sea, the filter processing unit 56 thins out the measurement point E, and estimates the measurement points A→B→D→F→G as the actual movement path accordingly. In an example indicated as a "case 3," the filter processing unit 56 thins out the measurement points F and G, and estimates the measurement points A→B→D→E as the actual movement path. On the other hand, in an example indicated as a "case 4," the measurement points A→B→C→D→E→F→G gradually move from the coast toward the sea. In this case, all the measurement points are excluded by the filter processing unit 56, and the movement path corresponding to the measurement points is set as the recording target. Further, in an example indicated as a "case 5," the measurement points A→B→C→D→E→F→G gradually move from the sea toward the coast, but the direction determining unit 57 does not set the movement path corresponding to the measurement points as the recording target. In other words, the movement path of measurement points A→B→C→D→E→F→G in the "case 5" is unlikely to be a motion of riding the wave and not set as the riding path of the recording target because an angle (inferior angle) of the direction of the movement path with respect to the traveling direction of the wave set in accordance with the display example of FIG. 3 is not within a predetermined angle range (for example, 70° to) 90°, and the direction of the movement path is close to the direction along the coast.

Figure 5:
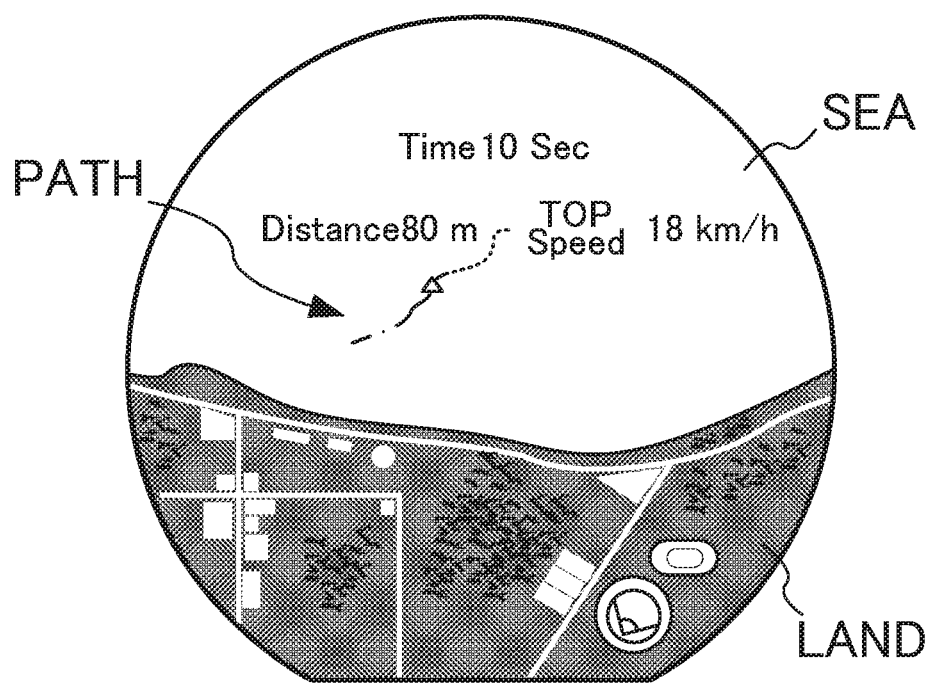
FIG. 5 is a schematic view showing an example of a map screen in which a riding path of one riding is indicated on a map.

FIG. 5 is a schematic view showing an example of the map screen in which the riding path of one riding is indicated on the map. As shown in FIG. 5, in the map screen, a map of a coast near a current position is set as the background, and a line indicating a movement path from a start position (a takeoff position) to an end position (a wipeout position) of one riding as the riding path is displayed. In the line displayed on the map screen, the position of the highest speed in the riding is identified and displayed by a mark, and the state of the speed at each position is identified and displayed in accordance with a difference of a line color. For example, a position with a speed less than 20% with respect to the highest speed can be indicated by blue, a position with a speed of 20% or more and less than 40% with respect to the highest speed can be indicated by light blue, a position with a speed of 40% or more and less than 60% with respect to the highest speed can be indicated by green, a position with a speed of 60% or more and less than 80% with respect to highest speed can be indicated by yellow, and a position with a speed of 80% or more with respect to the highest speed can be indicated by red. In FIG. 5, the state of the speed at each position is schematically indicated in accordance with a difference of a line type.

Here, in this embodiment, when the map of the coast near the current position is displayed, the display is performed such that the sea side is the upper side of the display screen of the LCD 14 (the upper side in FIG. 1A), the land side is the lower side of the display screen of the LCD 14 (the lower side in FIG. 1A). Accordingly, it is possible to intuitively display a history of a sport performed in a boundary region between the sea and the land like surfing in an easy to understand manner.

Operation

Figure 6:
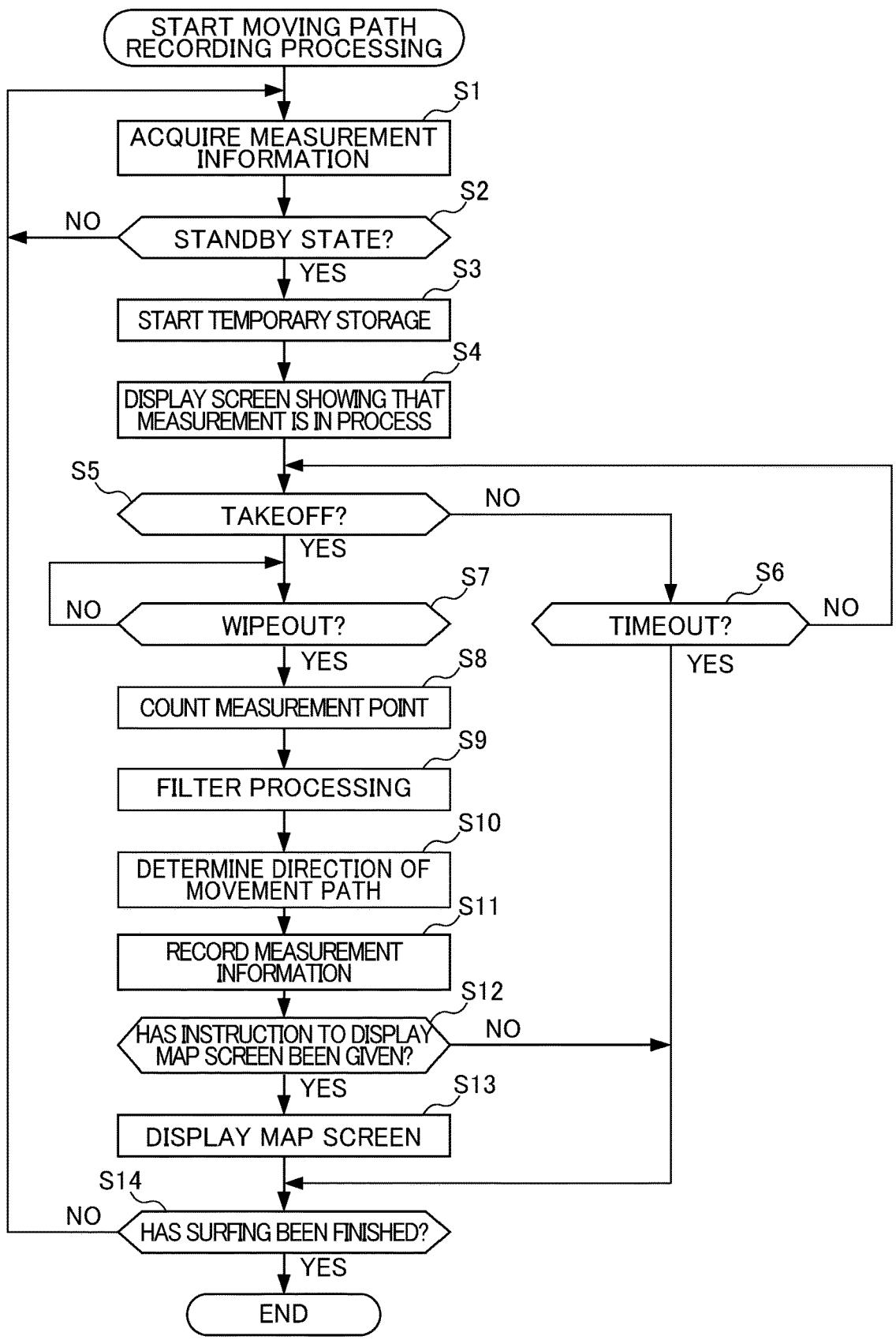
FIG. 6 is a flowchart showing the flow of the moving path recording processing executed by the wrist terminal having the functional configuration of the embodiment illustrated in FIG. 2.

Next, an operation of the wrist terminal 1 will be described. FIG. 6 is a flowchart showing the flow of the moving path recording processing executed by the wrist terminal 1 of FIG. 1 having the functional configuration of FIG. 2. The moving path recording processing is started when the user performs an operation of setting the surfing mode.

In step S1, the measurement information acquiring unit 51 acquires a positioning result of the GPS module 19 and detection results (measurement information) of various kinds of sensor installed in the sensor unit 12. In step S2, the standby detecting unit 52 determines whether or not the user wearing the wrist terminal 1 is in the standby state for surfing on the basis of the measurement information acquired by the measurement information acquiring unit 51. If the user wearing the wrist terminal 1 is not in the standby state for surfing, it is determined NO in step S2, and the process proceeds to step S1. On the other hand, if the user wearing the wrist terminal 1 is in the standby state of surfing, a determination result of step S2 is YES, and the process proceeds to step S3. In step S3, the recording control unit 58 starts temporarily storing the measurement information acquired by the measurement information acquiring unit 51 into the RAM 17. In step S4, the input/output control unit 59 displays predetermined measurement information on the LCD 14 as data being measured (displays a screen showing that the measurement is in process).

In step S5, the takeoff detecting unit 53 determines whether or not the user wearing the wrist terminal 1 has taken off on the basis of the measurement information acquired by the measurement information acquiring unit 51. If the user wearing the wrist terminal 1 has not taken off, a determination result of step S5 is NO, and the process proceeds to step S6. On the other hand, if the user wearing the wrist terminal 1 has taken off, a determination result of step S5 is YES, and the process proceeds to step S7.

In step S6, the wipeout detecting unit 54 determines whether or not the detection of the takeoff has timed out. If the detection of the takeoff has not timed out, a determination result of step S6 is NO, and the process proceeds to step S5. On the other hand, if the detection of the takeoff has timed out, a determination result of step S6 is YES, and the process proceeds to step S14. In step S7, the wipeout detecting unit 54 determines whether or not the user wearing the wrist terminal 1 has wiped out on the basis of the measurement information acquired by the measurement information acquiring unit 51. If the user wearing the wrist terminal 1 has not wiped out, a determination result of step S7 is NO, and the process of step S7 is repeated. On the other hand, if the user wearing the wrist terminal 1 has wiped out, a determination result of step S7 is YES, and the process proceeds to step S8.

In step S8, the measurement point counting unit 55 counts the number of measurement points at which the user is determined to have taken off on the basis of the measurement information acquired by the measurement information acquiring unit 51. At this time, when the counted value is a predetermined threshold value (for example, 5 points) or more, the measurement point counting unit 55 sets the data of the measurement points from the takeoff to the wipeout of the user as the processing target data.

In step S9, the filter processing for excluding data estimated to be an inappropriate measurement point is performed on the data of the measurement point set as the processing target data in the measurement point counting unit 55.

In step S10, the direction determining unit 57 determines whether or not the direction of the movement path of the measurement point is within a predetermined angle range with respect to the traveling direction of the input wave. At this time, when the direction of the movement path of the measurement point is within a predetermined angle range with respect to the traveling direction of the input wave, the direction determining unit 57 sets the direction as the riding path of the recording target. On the other hand, when the direction of the movement path of the measurement point is not within a predetermined angle range with respect to the traveling direction of the input wave, the direction determining unit 57 does not set it as the riding path of the recording target.

In step S11, the recording control unit 58 records (stores) the measurement information which is the measurement information from the takeoff to the wipeout among the measurement information temporarily stored in the RAM 17 and set as the recording target by the direction determining unit 57 among the measurement information from the takeoff to the wipeout which is temporarily stored in the RAM 17 in the ROM 16 or the removable medium 31 loaded into the drive 22. Further, the recording control unit 58 may record the measurement information from a predetermined time before the takeoff to a predetermined time after the wipeout. In step S12, the input/output control unit 59 determines whether or not an instruction to display the map screen of the movement path is given by the user. If the instruction to display the map screen of the movement path is not given by the user, a determination result of step S12 is NO, and the process proceeds to step S14. On the other hand, if the instruction to display the map screen of the movement path is given by the user, a determination result of step S12 is YES, and the process proceeds to step S13.

In step S13, the input/output control unit 59 displays the map screen in which the movement path of each riding is indicated on the map on the LCD 14 on the basis of the measurement information recorded in the ROM 16 or the removable medium 31 by the recording control unit 58. In step S14, the takeoff detecting unit 53 determines whether or not the user has finished the surfing. If the user has not finished the surfing, a determination result of step S14 is NO, and the process proceeds to step S1. On the other hand, if the user has finished the surfing, a determination result of step S14 is YES, and then the moving path recording processing ends.

Through such processing, the movement path satisfying a preset condition among the movement paths of the user from the takeoff to the wipeout is recorded in the wrist terminal 1 as the riding path. Specifically, when the number of measurement points at which the takeoff is determined to be performed is a predetermined threshold value or more, the data of the measurement point is set as the processing target. Also, if the measurement points which are adjacent chronologically have a position change from the coast toward the sea, the data of the measurement point is excluded. Furthermore, if the direction of the movement path is within a predetermined angle range with respect to the traveling direction of the input wave, the movement path is recorded as the riding path. Therefore, the movement path estimated to be an appropriate direction as the riding path in the relation with the traveling direction of the wave among the movement paths of the user in which the riding is performed for a certain period of time or more is set as the recording target. Therefore, it is possible to acquire the path in sports more appropriately.

Here, if it is determined whether or not the user is in a specific moving state (a state in which the user is riding after taking off or the like) in a sport on the basis of only the moving speed, a paddling state in surfing or the like may be erroneously determined to be the riding state. This is because, when paddling is performed toward the outside (the sea), a sudden speed comes out by backwash, and a speed comparable to the riding state is measured. Further, on days when there is a tide flow in the left and right direction (the direction along the coast), if paddling is performed in a flowing direction, a sudden speed comes out as in the above case, and thus it may be erroneously determined as the riding state. On the other hand, in the wrist terminal 1, when the direction of the movement path is within a predetermined angle range with respect to the traveling direction of the input wave, it is determined that it is a path of a specific moving state. Therefore, the possibility of erroneous determination as in the technique relying on only the moving speed is reduced.

First Modification

In the above-described embodiment, when the automatic measurement mode is set, the standby detecting unit 52 determines whether or not the user wearing the wrist terminal 1 is in the standby state for surfing, bodyboarding, snowboarding, or skiing on the basis of the measurement information acquired by the measurement information acquiring unit 51. In this case, a sport for which the user is in the standby state can be determined by setting respective conditions for identifying the standby state on a result of positioning by the GPS module 19 and on results of detections by the various sensors provided in the sensor unit 12 (measurement information), and by determining whether or not a current state satisfies these conditions.

For example, surfing and bodyboarding can be distinguished from snowboarding and skiing as follows based on measurement information: if a current position is at the sea, the user is determined to be in the standby state for surfing or bodyboarding; if a current position is at a mountain, the user is determined to be in the standby state for snowboarding or skiing. Surfing and bodyboarding can be distinguished from each other by determining whether or not the user has performed an action of standing up based on measurement information, for example. Snowboarding and skiing can be distinguished from each other using the direction of the body of the user relative to the traveling direction determined based on the measurement information. The standby detecting unit 52 may receive a setting showing a sport for which the user is in the standby state in response to selection of the sport made manually by the user.

After the standby state is detected, the recording control unit 58 records (saves) measurement information about exercise corresponding to one motion such as riding from takeoff to wipeout into the ROM 16 or the removable medium 31 loaded into the drive 22. For this recording (saving), the recording control unit 58 of this modification starts recording measurement information before start of the one motion with a first time interval for surfing and bodyboarding, and starts recording measurement information before start of the one motion with a second time interval for snowboarding and skiing. The first time interval is set longer than the second time interval.

Accordingly, the measurement information about surfing and bodyboarding, considered to attract greater interest from the user if being done for a longer duration before start of the one motion, can be recorded for a longer period of time than snowboarding and skiing before start of the one motion of the exercise. Similarly, the measurement information about surfing and bodyboarding may be recorded for a longer period of time after finish of the one motion of the exercise than the measurement information about snowboarding and skiing.

Second Modification

In the above-described embodiment, if the user is determined to have finished surfing in step S14 of the moving path recording processing, and then the standby state for surfing is detected again, the recording control unit 58 may start temporarily storing the measurement information, and thereafter when the takeoff is detected, the recording control unit 58 may record the measurement information into the ROM 16 or the removable medium 31 loaded into the drive 22.

Third Modification

In the above-described embodiment, when the map of the coast near the current position is displayed on the map screen, the display may be performed such that the sea side is the upper side of the display screen of the LCD 14, and the land side is the lower side of the display screen of the LCD 14 until the standby state is detected, and the display may be performed such that the sea side is the lower side of the display screen of the LCD 14, and the land side is the upper side of the display screen of the LCD 14 until the wipeout is detected after the standby state is detected. Accordingly, the map can be displayed in a direction conforming to exercise performed by the user.

Fourth Modification

Figure 7:
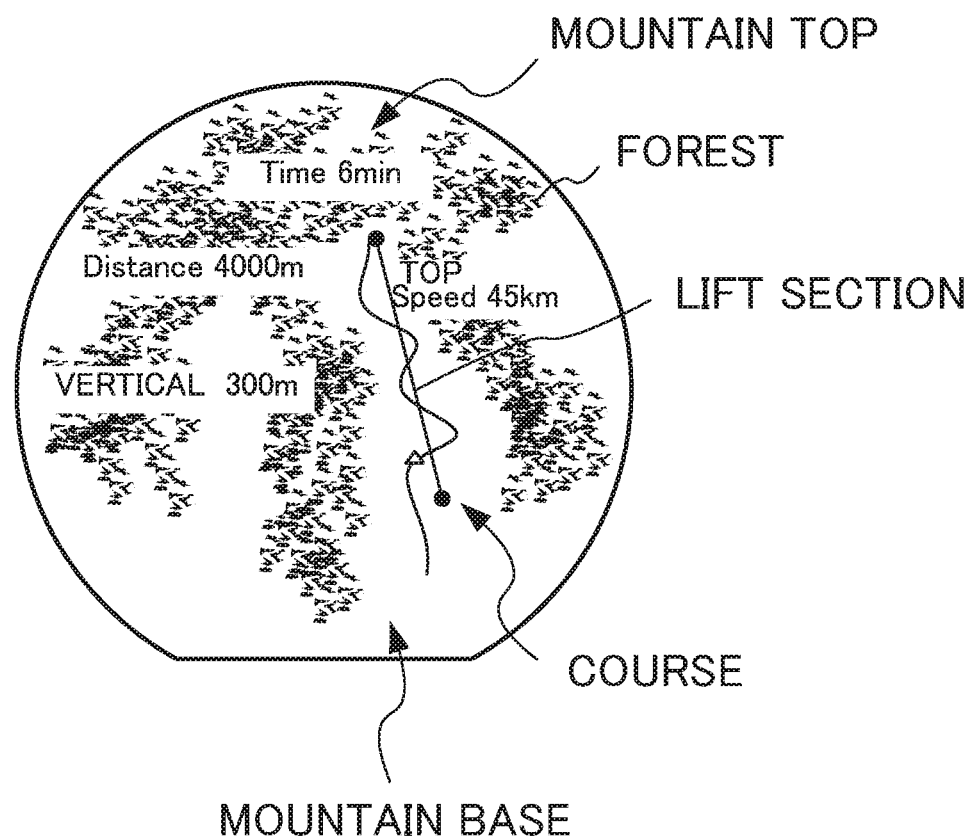
FIG. 7 is a schematic view showing an example of a map screen indicating a movement path of snowboarding or skiing.

In the above embodiment, a display form of the map screen can be changed in accordance with a type of sport. FIG. 7 is a schematic view showing an example of a map screen indicating a history of snowboarding or skiing. As shown in FIG. 7, when the map near the current position is displayed in order to display the movement path of snowboarding or skiing, the display can be performed such that the top of the mountain is the upper side of the display screen of the LCD 14 (the upper side in FIG. 1A), and the base side is the lower side of the display screen of the LCD 14 (the lower side in FIG. 1A). Accordingly, it is possible to display the map screen in a state that the course of snowboarding or skiing can be easily understood. Further, in the case of the present modification, a downhill direction of a slope is set instead of the traveling direction of the wave in the above-described embodiment. In this case, it is possible to set the downhill direction by the user drawing an arrow (such as a curved arrow) indicating the downhill direction on the map of the slope displayed on the LCD 14 with the finger. Further, movement path of a lift section not within a predetermined angle range from the set downhill direction can be excluded as the recording target by executing the moving path recording processing. Therefore, it is possible to acquire the path in the sport more appropriately.

Even in the present modification, similarly to the third modification, the display may be performed such that the top side of the mountain is the upper side of the display screen of the LCD 14, and the base side of the mountain is the lower side of the display screen of the LCD 14 until the standby state is detected, and the display may be performed such that the top side of the mountain is the lower side of the LCD 14, and the base side of the mountain is the upper side of the display screen of the LCD 14 until an end of sliding is detected after the standby state is detected. Accordingly, even in the case of snowboarding or skiing, the map can be displayed in a direction conforming to exercise performed by the user.

Fifth Modification

In the above embodiment, the direction determining unit 57 has been described as determining whether or not the direction of the movement path of the measurement point is within a predetermined angle range with respect to the traveling direction of the input wave. On the other hand, a relation between the direction of the movement path of the measurement point and the coast or the sea in the map set in accordance with a setting of the traveling direction of the wave may be determined. For example, a relation such as whether the direction of the movement path of the measurement point is a direction toward the sea, a direction toward the coast, or a direction parallel to the coast (lateral movement) may be determined. In this case, it is possible to determine whether or not the moving direction of the user is suitable as riding in accordance with an intuitively easy-to-understand criterion.

The wrist terminal 1 having the above-described configuration includes the measurement information acquiring unit 51, the direction determining unit 57, and the recording control unit 58. The measurement information acquiring unit 51 acquires the position information of the wrist terminal 1. The direction determining unit 57 determines whether or not the user holding the wrist terminal 1 is in a specific moving state in a sport. When the direction determining unit 57 determines that the user is in a specific moving state, the recording control unit 58 records the position information corresponding to the specific moving state as a path of the specific moving state in the sport in a predetermined recording means. Accordingly, the movement path determined to correspond to the specific moving state in the sport among the movement paths of the user is recorded as the path. Therefore, it is possible to acquire the path in the sport more appropriately.

The direction determining unit 57 determines whether or not the user holding the wrist terminal 1 is in a specific moving state in a sport on the basis of the relation between the moving direction of the wrist terminal 1 and a moving direction preset as a reference. Accordingly, it is possible to set the movement path estimated to be an appropriate direction as the path of the specific moving state in the sport as the recording target.

The wrist terminal 1 is used for water sport, particularly, marine sports. Therefore, wrist terminal 1 can be used to record a more appropriate riding path in surfing, bodyboarding, or the like.

The wrist terminal 1 includes the LCD 14 and the input/output control unit 59. The input/output control unit 59 sets the traveling direction of the wave and the direction of the coast or the sea with respect to the direction of the LCD 14. Accordingly, it is possible to set the traveling direction of the wave and the direction of the coast or the sea in a visually easy-to-understand manner.

The direction determining unit 57 determines whether or not the user holding the wrist terminal 1 is in the riding state or a state of wave waiting or paddling on the basis of the traveling direction of the wave set by the input/output control unit 59 and the moving direction of the wrist terminal 1. Accordingly, it is possible to distinguish the state of wave waiting or paddling and the riding state from each other, and it is possible to record a more appropriate riding path.

The direction determining unit 57 determines whether or not the moving direction of the wrist terminal 1 is a direction toward the sea, a direction toward the coast, or a direction parallel to the coast on the basis of the direction of the coast or the sea set by the input/output control unit 59. Accordingly, it is possible to determine whether or not the moving direction of the user holding the wrist terminal 1 is suitable as riding in accordance with an intuitively easy to understand criterion.

The wrist terminal 1 includes the takeoff detecting unit 53. The takeoff detecting unit 53 detects the moving speed of the wrist terminal 1. The direction determining unit 57 determines whether or not the user holding the wrist terminal 1 is in a specific moving state in a sport on the basis of the detection result of the takeoff detecting unit 53. Accordingly, it is possible to determine whether or not the user is a specific moving state in a sport using the moving speed as a determination criterion.

The present invention is not to be limited to the above-described embodiment. Various changes, modifications, etc. are also covered by the present invention as long as such changes, modifications, etc. fall in a range in which the object of the present invention can be achieved.

For example, in the above-described embodiment, the control unit 11 may determine whether or not a user is in a standby state for surfing by determining whether or not the user is floating on a wave based on measurement information. Further, the control unit 11 may determine whether or not the user has finished surfing by determining whether or not the user is moving on land (by walking or traveling on an automobile, for example) based on measurement information.

In the above-described embodiment, the takeoff detecting unit 53 may determine takeoff by detecting a user's transition from a state of floating on a wave to standing up on a surfboard based on measurement information. In this case, the takeoff detecting unit 53 can detect an upward acceleration resulting from the standing up, or detect the waveform of an acceleration and that of an angular velocity differing from those observed in the floating state.

In the above-described embodiment, the wipeout detecting unit 54 may determine wipeout by detecting a user's transition from a state of standing up to falling into the sea based on measurement information. In this case, the wipeout detecting unit 54 can detect a downward acceleration resulting from the falling into the sea, or detect the waveform of an acceleration and that of an angular velocity differing from those observed in the state of standing up on a surfboard.

In the above-described embodiment, a condition for wipeout may be satisfied if a state of falling short of a predetermined speed lasts for a predetermined period of time or more. This can reduce the likelihood of making a determination that a turn made on a relatively slow wave is wipeout, for example.

In the above-described embodiment, the wrist terminal 1 may detect making of a turn based on measurement information and record the number of turns. Further, the wrist terminal 1 may be allowed to record various types of measurement information. For example, the wrist terminal 1 may record the number of ridings, average riding intervals, a total riding distance, etc. In the above-described embodiment, if a position determined by the GPS shows an improper value (if a speed is determined to be 60 [km] or more, for example), measurement information corresponding to this positioning may be excluded from a recording target.

In the above-described embodiment, for display of a map screen, the scale of a map may be set to conform to the length of a path. For display of the map screen, the range of the map may be set in such a manner that the path is displayed within a predetermined area (central area, for example) in a display screen on the LCD 14. In the above-described embodiment, multiple paths may be displayed together on the map screen.

In the above embodiment, the GPS is used to acquire the position information, but the invention is not particularly limited thereto. For example, SiRFusion (registered trademark) for acquiring correct position information at a high speed using a Wi-Fi access point or a quantum compass capable of measuring a position even in the water can be used.

In the above embodiment, the positioning result of the GPS module 19 and the detection results (measurement information) of various kinds of sensors installed in the sensor unit 12 are acquired each time, but the position of the GPS module 19 may be performed when the user is determined to be in a specific moving state on the basis of the measurement information. In this case, the power saving effect is obtained since the power consumption of the GPS module is large.

In the above-described embodiment, the wrist terminal is given as an example of an electronic device to which the present invention is applied. However, the wrist terminal is not a particular limitation. For example, the present invention is applicable to general electronic devices having the function of measuring exercise. As more specific examples, the present invention is applicable to a notebook-type personal computer, a tablet terminal, a video camera, a portable navigation device, a cell phone, a smartphone, and a portable gaming device.

In the above-described embodiment, the control unit 11 in the wrist terminal 1 is responsible for control over the functional configuration of FIG. 2 or the operation shown in the flowchart of FIG. 5. Meanwhile, the following operation is also feasible. Data is transmitted through the wireless communication module 21 to a smartphone, for example (an external device). The smartphone makes calculation and transfers a result of the calculation (a path of a specific moving state such as riding) to the wrist terminal 1. Then, the result is displayed on the LCD 14. In the above-described embodiment, various types of data are recorded in the RAM 17 inside the wrist terminal 1 or the removable medium 31. Alternatively, data may be transmitted through the wireless communication module 21 to a smartphone and may be recorded into the smartphone, for example.

The present invention is applicable to a field outside of sports. For example, for acquisition of position information and recording of a movement path and movement time, the present invention may be applied to a drone, a throwing-type camera, a Frisbee with a sensor, or a movable robot, for example.

The processing sequence described above can be executed by hardware, and can also be executed by software. In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the wrist terminal 1 can be provided with the functions enabling the aforementioned processing sequence to be executed in its entirety. A single functional block may be configured by a single piece of hardware, a single installation of software, or any combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, a program configuring the software is installed from a network or a storage medium into a computer or the like. The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1B distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Flu-ray (Registered Trade Mark) or the like. The magnetic optical disk is composed of an MD (Mini-Disk) or the like. The storage medium supplied to the user in a state incorporated in the device main body in advance may include, for example, the ROM 16 shown in FIG. 1B or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

EXPLANATION OF REFERENCE NUMERALS

1 . . . wrist terminal, 11 . . . control unit, 12 . . . sensor unit, 13 . . . input unit, 14 . . . LCD, 15 . . . timepiece circuit, 16 . . . ROM, 17 . . . RAM, 18 . . . GPS antenna, 19 . . . GPS module, 20 . . . wireless communication antenna, 21 . . . wireless communication module, 22 . . . drive, 31 . . . removable medium, 51 . . . measurement information acquiring unit, 52 . . . standby detecting unit, 53 . . . takeoff detecting unit, 54 . . . wipeout detecting unit, 55 . . . measurement point counting unit, 56 . . . filter processing unit, 57 . . . direction determining unit, 58 . . . recording control unit, 59 . . . input/output control unit, 71 . . . history data storage unit

What is claimed is:

1. A movement analyzer, comprising:
a position information acquiring device;
a memory; and
a processor,
wherein the processor executes a program to perform operations comprising:
acquiring position information of the movement analyzer with the position information acquiring device;
determining whether or not a direction of a movement path of the movement analyzer is within a predetermined angle range with respect to a predetermined traveling direction;
determining whether or not a moving state of the movement analyzer is a specific moving state, wherein the processor determines that the moving state is the specific moving state when the direction of the movement path is within the predetermined angle range with respect to the predetermined traveling direction, and wherein the processor determines that the moving state is not the specific moving state when the direction of the movement path is not within the predetermined angle range with respect to the predetermined traveling direction; and recording the position information corresponding to the specific moving state in the memory as a path of the specific moving state when the processor determines that the moving state of the movement analyzer is the specific moving state.

2. The movement analyzer according to claim 1, wherein the movement analyzer is configured to be used in a water sport.

3. The movement analyzer according to claim 1, further comprising a display unit,
wherein the processor sets a traveling direction of a wave and a direction of a coast or a sea with respect to a direction of a display screen of the display unit, the traveling direction of the wave being set as the predetermined traveling direction.

4. The movement analyzer according to claim 3, wherein the processor sets the traveling direction of the wave and the direction of the coast or the sea with respect to the direction of the display screen of the display unit in response to an operation of a user.

5. The movement analyzer according to claim 3, wherein the processor determines whether or not a user holding the movement analyzer is in a riding state or in a state of wave waiting or paddling based on the set traveling direction of the wave and the direction of the movement path of the movement analyzer.

6. The movement analyzer according to claim 3, wherein the processor determines whether or not the direction of the movement path of the movement analyzer is a direction toward the sea, a direction toward the coast, or a direction parallel to the coast based on the set direction of the coast or the sea.

7. The movement analyzer according to claim 1, wherein the processor detects a moving speed of the movement analyzer and determines whether or not it is in the specific moving state based on a result of the detection.

8. A movement analysis method of recording position information executed by a processor of a movement analyzer, the movement analysis method comprising:
acquiring position information of the movement analyzer;
determining whether or not a direction of a movement path of the movement analyzer is within a predetermined angle range with respect to a predetermined traveling direction;
determining whether or not a moving state of the movement analyzer is a specific moving state, wherein the processor determines that the moving state is the specific moving state when the direction of the movement path is within the predetermined angle range with respect to the predetermined traveling direction, and wherein the processor determines that the moving state is not the specific moving state when the direction of the movement path is not within the predetermined angle range with respect to the predetermined traveling direction; and
recording the position information corresponding to the specific moving state in a memory as a path of the specific moving state when the moving state of the movement analyzer is determined to be the specific moving state.

9. The movement analysis method according to claim 8, wherein the movement analyzer includes a display unit, and the movement analysis method further comprises setting a traveling direction of a wave and a direction of a coast or a sea with respect to a direction of a display screen of the display unit, the traveling direction of the wave being set as the predetermined traveling direction.

10. The movement analysis method according to claim 9, wherein the traveling direction of the wave and the direction of the coast or the sea with respect to the direction of the display screen of the display unit is set in response to an operation of a user.

11. The movement analysis method according to claim 9, wherein acquiring the position information of the movement analyzer comprises acquiring map information around a current position and causing the display unit to display the map information as a background.

12. The movement analysis method according to claim 11, wherein when the map information is displayed, a range of a map is set so that the path of the specific moving state is displayed on a center portion of the map information displayed on the display screen of the display unit.

13. The movement analysis method according to claim 8, wherein the movement analysis method is executable in a state in which a user holding the movement analyzer is surfing, and the specific moving state is a riding state from takeoff to wipeout.

14. The movement analysis method according to claim 8, wherein the position information corresponding to the specific moving state is transmitted to an external device, and the external device is caused to generate the path of the specific moving state.

15. The movement analysis method according to claim 8, wherein determining whether or not the moving state of the movement analyzer is the specific moving state comprises determining whether or not a user holding the movement analyzer is in a state of wave waiting based on a set traveling direction of a wave and the direction of the movement path of the movement analyzer, the traveling direction of the wave being set as the predetermined traveling direction.

16. The movement analysis method according to claim 8, wherein determining whether or not the moving state of the movement analyzer is the specific moving state comprises determining whether or not a user holding the movement analyzer is in a riding state, based on a set traveling direction of a wave and the direction of the movement path of the movement analyzer, the traveling direction of the wave being set as the predetermined traveling direction.

17. The movement analysis method according to claim 8, wherein determining whether or not the movement state of the movement analyzer is the specific moving state comprises determining whether or not a user holding the movement analyzer is in a state of paddling based on a set traveling direction of a wave and the direction of the movement path of the movement analyzer, the traveling direction of the wave being set as the predetermined traveling direction.

18. A non-transitory computer-readable storage medium storing a program that is executable by a computer of a movement analyzer, the program being executable to cause the computer to perform operations comprising:
acquiring position information of a movement analyzer;
determining whether or not a direction of a movement path of the movement analyzer is within a predetermined angle range with respect to a predetermined traveling direction;
determining whether or not a moving state of the movement analyzer is a specific moving state, wherein the computer determines that the moving state is the specific moving state when the direction of the movement path is within the predetermined angle range with respect to the predetermined traveling direction, and wherein the computer determines that the moving state is not the specific moving state when the direction of the movement path is not within the predetermined angle range with respect to the predetermined traveling direction; and recording the position information corresponding to the specific moving state in a memory as a path of the specific moving state when the moving state of the movement analyzer is determined to be the specific moving state.

\* \* \* \* \*